UNITED STATES PATENT OFFICE.

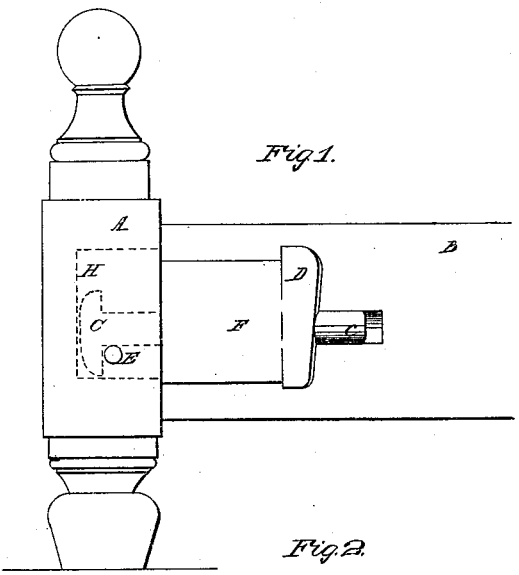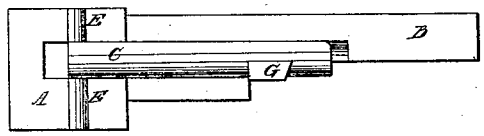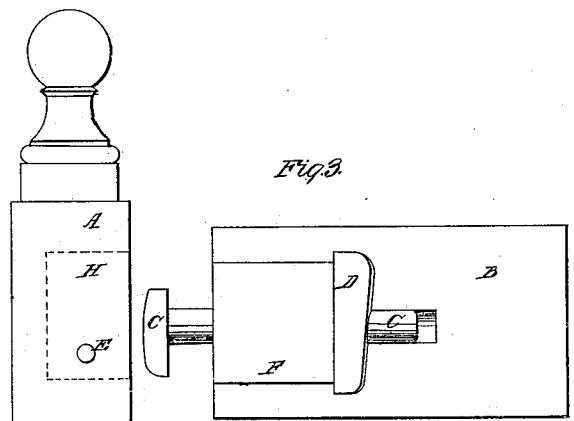

E. S. WRIGHT, OF BUFFALO, NEW YORK.

BEDSTEAD-FASTENING.

Specification of Letters Patent No. 20,839, dated July 6, 1858.

*To all whom it may concern:*

Be it known that I, EDWARD S. WRIGHT, of the city of Buffalo, in the county of Erie and State of New York, have invented certain new and useful Improvements in Bedstead-Fastenings; and I do hereby declare that the following is a full, clear, and exact description thereof, reference being had to the accompanying drawings and the letters of reference marked thereon.

The nature of my invention relates to the combination and arrangement of a coupling hook, pin and wedge, for the purpose of a simple, cheap and effective method of coupling and fastening the post and rail of a bedstead together as hereinafter set forth.

Figure I, is an elevation showing the manner of fastening the post and rail together by means of the combined action of the coupling hook wedge and pin. Fig. II, is a sectional view of the same. Fig. III, is an elevation, showing the post and rail separated with the coupling hook and wedge in the rail.

A is the post; B, rail; C, coupling hook. This may be made of wrought or cast iron. It is about three quarters of an inch in diameter with a T head, and about five inches in length. Its head, grapples, or hooks, on to the pin in the post. It also has a sort of open dovetail mortise (G) near its end into which the wedge is driven in order to tighten up and hold the post and rail together.

D is the wedge. This may be made of wood. One edge is beveled to fit the dovetail in the coupling hook. The other edge is straight and presses against the block F which is fastened on to the rail.

E is the iron pin, about $\frac{3}{8}$ of an inch in diameter. This passes through the post, and across the mortise chamber (H) so that the coupling hook will catch thereon.

F is the block, which is glued or otherwise fastened on to the rail, so that one half of the hole to receive the coupling hook may be made in this block and the other half in the rail. This block is made shorter than the hook, so that the body of the hook will pass through the block and bring the mortise outside and allow the wedge to be driven between the block and the dovetail in the hook and have a sufficient draw between them.

G represents a sort of open dovetail mortise made in the coupling hook, so that the wedge may have a hold and draw therein. It may also be made as a common mortise giving a slant at outer end to correspond to the tapers of the wedge.

H shows a mortise made in the post, through which the pin (E) passes, and into which mortise the head of the coupling hook enters and hooks on to the pin. The coupling hook is allowed to remain in the end of the rail, before the bedstead is set up. In putting the bedstead together it is only necessary to bring the rail and post together so that the hook will catch on to the pin in the post, and then the wedge is driven in, and the bedstead is firmly held together. It is only necessary to loosen the wedges in order to take the bedstead apart.

The advantages of my improvement are its great simplicity and cheapness and the perfect manner in which it accomplishes the purpose for which it is designed. These advantages are all apparent. By using this combination the post and rail may be held together perfectly tight at all times because the wedge will be given sufficient draw to compensate against any wear of the fixtures or shrinkage of the timber.

It is so simple, that the most ordinary mechanic can construct it and the most simple domestic can use it.

I disclaim either device separately considered, but

I claim—

The combination of the coupling hook C, wedge D, and pin E arranged in the manner and for the purpose herein set forth.

EDWARD S. WRIGHT.

Witnesses:
 THEODORE P. GOULD,
 E. B. FORBUSH.